United States Patent [19]

Boursier et al.

[11] Patent Number: 4,497,846
[45] Date of Patent: Feb. 5, 1985

[54] SUGARLESS HARD CANDY

[75] Inventors: Bernard Boursier, Haisnes; Guy Bussiere, La Gorgues; Francis Devos, Hazebrouck; Michel Hughette, Merville, all of France

[73] Assignee: Roquette Freres, Lestrem, France

[21] Appl. No.: 489,468

[22] Filed: Apr. 28, 1983

[30] Foreign Application Priority Data

Apr. 30, 1982 [FR] France ............................. 82 07586

[51] Int. Cl.³ .......................... A23G 3/00; A23L 1/09
[52] U.S. Cl. ................................. 426/660; 426/658; 426/548; 426/804
[58] Field of Search ................ 426/660, 804, 658, 548

[56] References Cited

U.S. PATENT DOCUMENTS

| Re. 26,959 | 9/1970 | Conrad | 426/658 |
|---|---|---|---|
| 3,114,642 | 12/1963 | Meisel | 426/660 |
| 3,332,783 | 7/1967 | Frey | 426/660 |
| 3,438,787 | 4/1969 | Du Ross | 426/660 |
| 3,556,811 | 1/1971 | Smith | 426/660 |
| 3,738,843 | 6/1973 | Frey | 426/660 |
| 3,826,857 | 7/1974 | Horn et al. | 426/660 |
| 4,154,867 | 5/1979 | Aldrich | 426/660 |
| 4,238,510 | 12/1980 | Cherukuri et al. | 426/5 |
| 4,292,337 | 9/1981 | Andersen | 426/660 |
| 4,311,722 | 1/1982 | Vink et al. | 426/660 |
| 4,316,915 | 2/1982 | Friello et al. | 426/5 |
| 4,372,942 | 2/1983 | Cimiluca | 426/660 |

FOREIGN PATENT DOCUMENTS

| 2409107 | 9/1974 | Fed. Rep. of Germany | 426/660 |
|---|---|---|---|
| 2410962 | of 0000 | France . | |
| 081932 | 1/1973 | Japan | 426/660 |
| 038553 | 9/1976 | Japan | 426/660 |
| 2052946 | of 0000 | United Kingdom | 426/3 |
| 2053651 | of 0000 | United Kingdom | 426/3 |
| 1481738 | of 0000 | United Kingdom | 426/660 |

Primary Examiner—Jeanette Hunter
Attorney, Agent, or Firm—Larson and Taylor

[57] ABSTRACT

Sugarless hard candy comprising, on the one hand, as sugarless boiled sugar, a hydrogenated starch hydrolysate prepared from a starch hydrolysate having a D.E. of 42 to 60, on the other hand, a quantity of gum arabic between 1% and 8% by weight with respect to the finished product, preferably between 2% and 6% by weight, and/or an amount of CMC between 0.2 and 2% by weight with respect to the finished product, preferably between 0.3 and 1.2%.

14 Claims, No Drawings

SUGARLESS HARD CANDY

The invention relates to a sugarless hard candy and to a process for the manufacture of the same.

Hard candies are well-known to the consumer and in the confectionery field, and have a brittle consistency and a glassy appearance.

Conventional hard candies are traditionally constituted by a mixture of saccharose and glucose syrup, dehydrated by cooking, if necessary under vacuum. In the case of sugarless hard type candy and still conventionally, the mixture of saccharose and glucose syrup has been replaced by sorbitol syrups containing, if necessary, mannitol and, more recently, by hydrogenated starch hydrolysates.

Candy manufactured by means of sorbitol syrups containing possibly mannitol have two major drawbacks, namely:

the long lapse of time necessary to achieve complete hardening, which impedes the continuous operation of manufacturing installations, the phenomena of crystallisation due to the high proportion of sorbitol in the syrups concerned.

In addition, by reason of the fluidity of the cooked mass, the manufacture of this candy imposes recourse to a process of casting into molds, while hot, (120° C. approximately), of the mass of sugarless hard candy whereas, in the case of conventional hard candies, it was also possible to cut them up from a roll, the constituent candy of which is cooled to about 70° C.-80° C.

To improve the quality of this candy, manufacturers of sugarless hard candy have proposed to add gum arabic to sorbitol-mannitol mixtures, the gum arabic having the role of retarding or inhibiting the recrystallisation of the sorbitol.

The use, for the manufacture of sugarless hard candy, of hydrogenated starch hydrolysates instead of sorbitol syrups has permitted recourse to gum arabic to be abandoned, the candy so manufactured not showing crystallisation phenomena and only requiring particularly short hardening times.

In addition, the manufacture of sugarless hard candy produced by means of these hydrolysates is closely related to that of conventional hard candy, thus making possible both shaping by casting in moulds and shaping by cutting up a roll.

The hydrogenated starch hydrolysates which had first been proposed in practice were those obtained from starch hydrolysates of dextrose-equivalent (D.E.) of 30 to 40.

The candies obtained from these hydrolysates show in fact a complete amorphous condition, are insensitive to crystallisation without it being necessary to resort to gum arabic additions and hence still preserve a vitreous or glassy appearance.

They are not however devoid of drawbacks. In fact, on the one hand, they are of little sweetness, hence necessitating recourse to artificial sweeteners such as saccharinates or cyclamates or aspartam and, on the other hand, show proof of a non-negligible cariogenic nature.

The first of these drawbacks was eliminatable by recourse to hydrogenated starch hydrolysates obtained from starch hydrolysates with a higher D.E., comprised between 42 and 60.

The second was more recently eliminated by means of the use of hydrogenated starch hydrolysates comprising in addition a proportion below 3%, preferably below 1.5% of polyols of degree of polymerisation (or DP) higher than 20.

The sugarless hard candy based on these hydrogenated starch hydrolysates hence no longer shows the drawbacks of sugarless hard candy based on the prior hydrolysates.

Other drawbacks are associated however with the use of hydrogenated starch hydrolysates obtained by hydrogenation of starch hydrolysates having a DE of 42 to 60.

The first of these drawbacks resides in a flow or creep phenomenon called "cold-flow" of which the constituent material of the candy is the seat, this phenomenon, which is rather slow at 20° C. but which accelerates with rising temperature, being manifested in the long run by deformation of the candies, prejudical to their marketing.

The second drawback resides in the non-negligable hygroscopic nature of this candy, due to the fact that confectionery products based on these hydrogenated starch hydrolysates must be brought to a water content less than 2%, preferably less than about 1%, which results in a tendency to the taking up of water again in storage.

The cold-flow may be considerably reduced by lowering the residual moisture content of the candy to a value less than about 1%, but this lowering is very difficult to effect at the industrial stage and results in any case in a very appreciable aggravation of the hygroscopic nature of the candy, the latter having for this reason a much higher tendency to stick to the wrapping paper.

To establish ideas, it is indicated that the moisture or water content of hard candy is determined, with respect to the measurements carried out with respect to the present invention, by the so-called Karl FISHER method.

It was therefore a particular object of the invention to provide a solution enabling simultaneously a remedy for these two drawbacks whereas, until now, the attenuation of one was manifested by the amplification of the other, the technician having therefore been obliged until now to satisfying himself with a compromise between the two.

Now, the Applicants have had the merit of having discovered, as the result of a very large number of tests, that the two drawbacks concerned could be in fact lessened if not eliminated at the same time by the incorporation in the constituent hydrogenated starch hydrolysate of the sugarless hard candy of an effective amount of gum arabic or of carboxymethylcellulose or CMC, which was all the more unexpected as the replacement of sorbitol and mannitol mixtures by hydrogenated starch hydrolysates had precisely enabled the suppression of recourse to the use of gum arabic previously necessary as an agent for combating the excessive time of hardening and against crystallisation; this suppression has been considered as constituting a determining advantage.

Consequently, the sugarless hard candy according to the invention is characterised by the fact that it comprises, as sugarless boiled sugar, a hydrogenated starch hydrolysate prepared from a starch hydrolysate having a DE of 42 to 60, the usual constituents such as flavours, dyes, acids and the like, as well as a quantity of gum arabic and/or of CMC sufficient so that, on the one hand, the water content of the final candy may be higher than about 1% and particularly comprised between about 1% and 3%, thereby reducing the tendency to reabsorb water and hence to hygroscopicity and so that, on the other hand, the tendency of cold-flow of the finished product becomes considerably reduced.

In the case of gum arabic, the "sufficient" quantity is comprised between 1 and 8% by weight with respect to the finished product, preferably between 2 and 6% by weight.

In the case of CMC, the "sufficient" quantity is comprised between 0.2 and 2% by weight with respect to the finished product, preferably between 0.3 and 1.2%.

The hydrogenated starch hydrolysates of HSH included as sugarless sugar by the above-said confectionery are obtained from starch hydrolysates having a DE between 42 and 60, preferably between 45 and 60 and, more preferably still, between 45 and 55 and have furthermore, contents expressed with respect to the dry matter of the hydrolysates:

a sorbitol content of 0.1 to 19%, preferably 0.2 to 17%,
a content of maltitol from 35 to 80%, preferably from 35 to 65 and more preferably still, from 40 to 58%,
the complement to 100 being constituted by polyols of degree of polymerisation (DP) higher than 2.

Still more preferably, the abovesaid HSH are obtained from starch hydrolysates having a content below 3%, more particularly below 1.5%, of products of DP higher than 20.

An inherent advantage in the invention resides actually in the fact that the presence of the gum arabic or the CMC does not counter the non cariogenic properties of the latter hydrogenated starch hydrolysates.

It may be advantageous, in certain cases, to incorporate with the constituent hydrogenated starch hydrolysate of the sugarless hard candy according to the invention, an amount of mannitol which can range up to 10% by weight but is generally between 1 and 8% by weight of the total weight of the confectionary.

This incorporation in fact enables the tendency of the finished candy to reabsorb water to be further reduced, hence its propensity, already considerably decreased, to be sticky, and it is made possible by the presence of the gum arabic and/or of the CMC.

The fact that the sugarless hard candy according to the invention may have a final content of water higher than 1%, particularly 1 to 3%, made possible by the presence of the gum arabic or of the CMC in the mass subjected to dehydrating cooking, generally enables the dehydration to be conducted at a temperature below that normally necessary in the absence of these products provided according to the invention; this advantage may have important practical repercussions on the manufacture.

In the case of incorporation of gum arabic, the cooking temperature may in fact, in practice, be selected below about 5° to 15° C. with respect to the temperatures necessary previously for preparing sugarless hard candy from hydrogenated starch hydrolysate.

This lowering of the cooking temperature, small as it may appear, is extremely advantageous since it makes possible manufacture of the candy with steam pressures of the order of 8 bars instead of 10 bars which were necessary at temperatures previously used and which were of the order of 160° to 170°; in other words, it makes necessary the recourse to specially adapted installations; on the contrary, conventional installations used in the manufacture of hard candies remain usable.

It follows that, according to the invention, to prepare the candy according to the invention, successively:

with hydrogenated starch hydrolysate are incorporated, besides the conventional additives, a sufficient proportion of gum arabic and/or CMC, and if necessary up to 10% by weight of mannitol, the mixture thus obtained is brought to a temperature generally higher than 140° C., this temperature is maintained under vacuum of at least 700 mm Hg until the moisture content of the mixture is brought to a value below about 3% by weight, particularly from 3 to about 1% by weight, the mass so obtained is cast in moulds or, more preferably, is given the shape of a roll from which the candies are cut off, the confectionery products so obtained are wrapped after shaping and cooling.

Below are described, within the scope of the examples, tests carried out at the laboratory stage and at the pilot stage and which have permitted Applicant to realize the invention.

EXAMPLE 1

Through a first set of tests, a selection was effected among tens of thickening products selected from the group comprising:

extracts of algae: carregheenins, agar-agar,
gums of vegetable origin: guar, carob gum tragacanth, gum arabic,
products developed by microorganisms: xanthane and dextran,
synthetic products: carboxymethylcellulose (or CMC), polyvinylpyrrolidone (or PVP), carboxymethyl starch which were used in the manufacture of candy whose constituent material was hydrogenated starch hydrolysate (HSH 1) having the following composition (percentages expressed to dry matter) and obtained by hydrogenation of starch hydrolysate having a DE of 48.2:

| | |
|---|---|
| DP 1 | 7.0 |
| DP 2 | 51.5 |
| DP 3 | 18.0 |
| DP 4 to DP 10 | 15.5 |
| DP 10 to DP 20 | 6.7 |
| DP>20 | 1.3 |

The operational method applied for these first tests included:

mixing the product and the hydrolysate,
cooking the mixture in a copper vessel on an electric plate to the temperature of 180° C. with frequent stirring,
casting on to cold marble of the boiled mass once the temperature of 180° C. is reached.
cutting up the cooled mass at about 60°–80° C. into candies of 15×15 mm,
wrapping the candies.

The tests executed on each of the candies thus manufactured and which had the purpose of evaluating the resistance to cold-flow and to hygrocopicity were as follows:

(1) Test of resistance to cold-flow

The candies (unwrapped) are placed in a dessicator containing a saturated lithium chloride solution ensuring in the dessicator a relative humidity comprised between 10 and 15%.

To accelerate the phenomenon, the dessicator had been kept at exactly 50° C. in a closed oven.

The cold flow was evaluated over time and noted as poor, average or good according to the surface area occupied by the candy after a week of test. (good: surface occupied identical at the beginning and at the end of the test)
(poor: surface at least doubled at the end of the test).

(2) Hygroscopicity test

Candies (unwrapped) of known weight were placed at 20° C. in a dessicator containing a saturated sodium nitrite solution ensuring in the dessicator a relative humidity of 66%. The weight of the candies was checked daily for 6 days.

Results obtained for the thickening products employed at various concentrations (expressed as percentages with respect to the dry matter of the hydrolysate) are collected in table 1.

The result is considered as:
  good, if the candy has reabsorbed less than 2.5% water after 6 days,
  poor, if the candy has taken up more than 3% water after 6 days.

The results recorded both for the test of resistance to cold-flow and for the hydroscopicity test are collected in Table I below:

TABLE I

| Families of products tested | Nature of the product and amount utilised (% by weight with respect to the dry matter of the hydrolysate) | | Hygroscopicity | Cold flow |
|---|---|---|---|---|
| Algae extracts | Kappa carragheenin known under the trademark "GENULACTA CPS" and marketed by HERCULES | 1% | good | average |
| | | 2% | average | average |
| | | 3% | good | average |
| | Kappa carragheenin known under the trademark "GENUGEL TOR-2" and marketed by HERCULES | 5% | poor | poor |
| | Mixed carragheenin gelling hot, known under the trademark "GELOGEN 4" and marketed by CECA | 5% | poor | poor |
| | Gelling carragheenin known under the trademark "SATIAGEL SIA" and marketed by CECA | 5% | good | average |
| | Thickening carragheenin known under the trademark "SATIAGUME" and marketed by CECA | 5% | average | average |
| | Thickening carragheenin known under the trademark "AUBYGEL MR 50" and marketed by CECA | 5% | poor | average |
| | Thickening carragheenin known under the trademark "AUBYGUM X2" and marketed by CECA | 5% | poor | average |
| | Thickening carragheenin known under the trademark "AUBYGUM DM" and marketed by CECA | 5% | poor | poor |
| | | 7% | poor | poor |
| | Agar-agar | 5% | average | |
| Gums of vegetable origin | Guar | 2% | average | poor |
| | | 3% | average | poor |
| | | 5% | average | poor |
| | Carob | 5% | average | average |
| | Gum tragacanth | 5% | average | good |
| | | 1.5% | average | average |
| | Gum arabic | 3% | good | good |
| | | 4% | good | good |
| | | 5% | good | good |
| Products derived from micro-organisms | Xanthane | 0.3% | average | average |
| | | 0.5% | | difficult to cook |
| | | 5% | poor | average |
| | Dextran 70 000 | 7.5% | poor | good |
| | | 10% | poor | good |
| | | 12.5% | poor | good |
| | | 0.5% | poor | poor |
| | Dextran 5 000 000 | 1% | poor | poor |
| | | 2% | average | good |
| | Dextran 200 000–300 000 | 1% | poor | good |
| | | 2% | poor | good |
| Synthetic Products | PVP (polyvinylpyrrolidone) impossible too much froth | | | |
| | Carboxymethylcellulose marketed under the name "CMC 160" (degree of substitution D.S. = 0.7 — low viscosity) by HERCULES | 5% | average | good |
| | Carboxymethylcellulose marketed under the name "CMC 9 M 65 F" (degree of substitution D.S. = 0.9 — average viscosity) by HERCULES | 5% | good | good |
| | | 4% | average | good |
| | Carboxymethylcellulose marketed under the name "CMC 7 M F" (degree of substitution D.S. = 0.7 — average viscosity - food quality) by HERCULES | 5% | good | good |
| | Carboxymethylstarch (degree of substitution D.S. = 0.17) | 3% | average | average |
| | | 5% | | |

It follows from the results collected in Table 1 that carboxymethylcellulose used at 5% and that gum arabic used at 3%, 4% and 5% behave well in the high viscosity and cold-flow tests.

In order to evaluate their action better, these products were taken for a second series of tests in which the cooking and evaluation conditions were slightly modified.

In these tests, the following products were compared:
  hydrogenated starch hydrolysate (HSH 1) defined above (control)
  HSH 1 supplemented with gum arabic (or GA) to 3%

HSH 1 supplemented with carboxymethylcellulose (or CMC) 7 MF at 0.5%
HSH 1 supplemented with carboxymethylcellulose (or CMC) 7 MF at 0.7%.

In this second series of tests, the cooking was not conducted up to a given temperature but up to a given weight, that is to say up to a given residual water content.

To do this, the electric plate and the cooking vessel were placed on a balance and the development of the weight of the cooked mass (increase of the dry matter) was read at once proportionally with the evaporation of the water.

For each of the above cited compositions, candies were cooked so that their contents of residual water should be 1%, 1.5% and 2%.

The final cooking temperature corresponding to the desired content of residual moisture was recorded for each test.

The tests and measurements described below are applied to each of the test products. The results were collected in Table II.

(1) Stickiness Test

The samples were kept in an atmosphere with 66% relative humidity for 60 hours; the reabsorption of water was then comprised between 0.5 and 1%.

The apparatus used to characterise the stickiness may be that known under the trademark "INSTRON 1122".

A parallelepipedic lump of boiled sugar was placed between the jaws of the measuring vice comprised by this apparatus so that the upward facing surface of this lump is positioned horizontally. A pastille supporting a weight of 330 g is applied to the upward facing surface of the candy and is left in place under the effect of its weight for 15 seconds.

The force (expressed in newtons) necessary to pull off the pastille is then measured.

The more sticky it is the greater is the force.

(2) Hygroscopicity

The measurement was identical with that described with respect to the preceding tests.

In Table II are noted the average reabsorptions by weight for each type of candy after 1, 2, 3 and 6 days as well as the deformation of the candy after 6 days, namely:

very considerable deformation: marked 10, (flow)
no deformation: marked 0.

(3) Test of resistance to cold flow

This test was identical with that described above; the flow is evaluated by marks ranging from 0 to 10, 0 representing a minimal flow and 10 a very considerable flow.

Comparatively with the results obtained with candles based on hydrogenated starch hydrolysate alone (HSH 1), the use of gum arabic or of CMC leads for the manufacture of candies:

to a decrease in cooking temperature (results shown in Table II) for an identical residual water content, particularly marked for 1% of water; this temperature is 192° C. for the candy based on HSH 1 alone, preferably 185° C. in the presence of gum arabic, 188° C. in the presence of CMC;

to a decrease in hygroscopicity (water reabsorption lower) accompanied by less deformation of the candies at the end of the hygroscopicity test;

to better resistance to cold flow.

In comparison with gum arabic, CMC gives candies more resistant to cold flow but slightly stickier under the conditions of the previously defined stickiness test.

TABLE II

|  |  |  | Control |  |  | GA at 3% |  |  | CMC at 0.5% |  |  | CMC at 0.7% |  |  |
| --- | --- | --- | --- | --- | --- | --- | --- | --- | --- | --- | --- | --- | --- | --- |
| Final water content of the candy |  |  | 1 | 1.5 | 2 | 1 | 1.5 | 2 | 1 | 1.5 | 2 | 1 | 1.5 | 2 |
| Cooking temperature in °C. |  |  | 192 | 178 | 165 | 185 | 175 | 166 | 188 | 178 | 167 | 188 | 178 | 167 |
| Stickiness: Force in N |  |  | 5.6 | 5.4 | 5.6 | 5.3 | 4.9 | 4.8 | 6.8 | 6.9 | 6.8 | 6.4 | 5.1 | 5.6 |
| Hygro- | Reabsorption | 1 day | 0.83 | 0.67 | 0.67 | 0.62 | 0.58 | 0.57 | 0.59 | 0.79 | 0.77 | 0.79 | 0.79 | 0.71 |
| scopicity | in % weight | 2 days | 1.35 | 1.14 | 1.15 | 1.02 | 0.96 | 0.95 | 0.98 | 1.15 | 1.12 | 1.14 | 1.18 | 1.04 |
|  | after | 3 days | 1.77 | 1.49 | 1.53 | 1.33 | 1.24 | 1.24 | 1.26 | 1.34 | 1.32 | 1.34 | 1.39 | 1.21 |
|  |  | 6 days | 3.41 | 3.00 | 3.10 | 2.64 | 2.50 | 2.47 | 2.39 | 2.37 | 2.25 | 2.34 | 2.40 | 2.37 |
| Deformation after 6 days |  |  | 9 | 9 | 10 | 8 | 7 | 7 | 4 | 5 | 6 | 5 | 4 | 4 |
| Cold flow after 6 days of testing |  |  | 4 | 7 | 10 | 2 | 5 | 7 | 1 | 3 | 7 | 1 | 3.5 | 4 |

It is possible, from the results of Table II, to summarize the advantage of GA and CMC in the improvement of candy based on hydrogenated starch hydrolysate in comparing the hygroscopicity of candy (with and without GA and/or CMC) having an approximately similar resistance to the test of resistance to cold flow.

The corresponding values are collected in Table III below:

TABLE III

|  | CON-TROL | HSH 1 + GA at 3% | HSH 1 + CMC at 0.5% | HSH 1 + CMC at 0.7% |
| --- | --- | --- | --- | --- |
| Cold flow | 4 | 5 | 3 | 3 |
| Water content in % | 1 | 1.5 | 1.5 | 1.5 |
| Cooking temperature (°C.) | 192 | 175 | 178 | 178 |
| Hygroscopicity after 6 days (%) | 3.41 | 2.50 | 2.37 | 2.40 |
| Deformation after hygroscopicity test | 9 | 7 | 5 | 4 |

It appears, on examining this Table, that the presence of a low percentage of gum arabic or of CMC hence enables the cooking temperature to be diminished, at the same time as considerably reducing the hygroscopicity of the product (up to 30% in these tests) and reducing the deformation associated with water absorption.

EXAMPLE 2

The laboratory tests were completed by similar tests on conventional confectionery material.

The following operational steps:
charging a cooker of the trademark "OTTO HANSEL" with 30 kg of HSH 1 defined in example 1, with 75% of dry matter, possible dispersion of gums or other products, directly in the cooker, with stirring, cooking in 10 to 15 minutes, then placing under vacuum (700 mm Hg) for 2 minutes 30 seconds, cooling on a cold table, passage through a roll shaper towards 80° C., cooling system—exit from the system towards 50°–54° C., wrapping on an automatic wrapping machine, were employed successively under the conditions indicated below:

HSH 1 alone at 160° C. and 150° C. (tests 1 and 2)

mixture HSH 1 and 3.5% of gum arabic at 150° C. and 140° C. (tests 3 and 4)

mixture HSH 1 and 0.8% plus 0.4% of agar-agar at 140° C. (tests 5 and 6)

mixture HSH 1 and 0.8% of carregheenin (trademark "SATIAGEL MR") at 140° C. (test 7).

In Table IV below are collected, for each test, the observations made in the course of the manufacture and the results of the measurements of the residual water content (Karl Fisher method) of the hygroscopicity test and of the "cold flow" test described above.

cre to the cold flow test. At 150° C., gum arabic (test No. 3) contributes sufficient resistance to the candy whilst reducing its hygroscopicity.

The results collected in accordance with the laboratory tests are hence confirmed by the industrial tests. By means of the addition of gum arabic, a cooking temperature reduced by 10° C. enables the production of candies based on hydrogenated starch hydrolysate having a better resistance to cold flow and a reduced hygroscopicity, comparatively with a control not containing gum arabic.

The employment of the other hydrocolloids tested changes in certain cases the texture of the cooked mass.

Thus, candies containing carragheinin and agar-agar could not be manufactured normally since the elastic texture conferred by these products interferes with the operation of the roller and of the wrapper.

Gum arabic, not having unfavourable rheological properties, hence gives full satisfaction in these manufactures.

EXAMPLE 3

This example illustrates the use of mannitol in associa-

TABLE IV

| Test No. | HSH with 75% d.m.* (kg) | Gum arabic powder (kg) | Agar-agar (kg) | SATIAGEL MR (kg) | Cooking temperature in °C. | Observations | $H_2O$ % | Hygroscopicity After 7 days | Hygroscopicity After 15 days | Cold flow 10 very poor 1 very good |
|---|---|---|---|---|---|---|---|---|---|---|
| 1 | 30 | — | — | — | 160 | | 1.43 | + 2.87 | + 5.57 | 3 |
| 2 | 30 | — | — | — | 150 | Very fluid, deforms easily on emerging from the cooling tunnel | 2.11 | + 2.68 | + 5.29 | 8 |
| 3 | 30 | 0.79 | — | — | 150 | Fairly viscous | 1.37 | + 2.21 | + 4.10 | 1 |
| 4 | 30 | 0.79 | — | — | 140 | Slight coloration works easily | 2.44 | + 2.01 | + 3.68 | 7 |
| 5 | 30 | — | 0.18 | — | 140 | Very elastic texture, very tenacious, does not pass over the ma-machine | 2.08 | + 2.36 | + 4.51 | 7 |
| 6 | 30 | — | 0.09 | — | 140 | Very elastic, very tenacious, considerable re-traction, does not pass over the machine | 1.98 | + 2.65 | + 5.20 | 8 |
| 7 | 30 | — | — | 0.18 | 140 | Too elastic, highly coloured, does not pass over the machine | — | — | — | — |

*d.s. = dry matter

On examining Table IV, it is observed that the cooking temperature before application of the vacuum for a candy based on HSH 1 alone cannot be less than 150° C. (test No. 2), the resistance to cold flow showing itself to be already mediocre for this test.

It is observed, on the other hand, that the candies of test No. 1 had good resistance to cold flow, but high hygroscopicity.

The candies including gum arabic and cooked at 140° C. (test No. 4) were hardly hygroscopic but also mediotion with gum arabic and/or CMC for the manufacture of candies based on hydrogenated starch hydrolysates.

The use of mannitol could in fact show itself to be interesting to limit the hygroscopicity of candies, in the sense that this product could result, after slight reabsorption of water by the candy, in a fine recrystallisation at the surface, thus forming a "barrier" which has the result of restraining moisture transfer.

However and as the following tests will show, the incorporation alone of mannitol for the manufacture of candies based on hydrogenated starch hydrolysates having a DE before hydrogenation of 42 to 60 is not advantageous since it accentuates in fact notably the tendency to cold flow of the candies.

In this example, the tests have been carried out on a hydrogenated starch hydrolysate (HSH 2) having the following composition (percentages expressed on dry matter):

| | |
|---|---|
| DP 1 | 3.6 |
| DP 2 | 54.0 |
| DP 3 | 18.1 |
| DP 4 to DP 10 | 10.7 |
| DP 10 to DP 20 | 8.7 |
| DP>20 | 4.9 |

Before hydrogenation, this hydrolysate had a DE about 47.6.

The method of preparation of the candies was identical with that described in example 1.

In table V are collected the results recorded from the point of view of deformation after the hygroscopicity test, from the point of view of evaluation of surface recrystallisation and from the point of view of the cold flow test, for candies manufactured on the one hand with hydrogenated starch hydrolysate (HSH 2) alone, on the other hand with mixtures of HSH 2 and respectively 5, 7.5 and 10% of mannitol (the percentages being expressed with respect to the dry matter of the hydrolysate), the cooking temperature being 180° C.

TABLE V

| Test No. | % of mannitol | Deformation after the hygroscopicity test | Evaluation of the surface recrystallisation | Evaluation of cold flow |
|---|---|---|---|---|
| 1 | 0 | 9 | none | 4 |
| 2 | 5 | 5 | + | 10 |
| 3 | 7.5 | 0 | +++ | 10 |
| 4 | 10 | 0 | +++ | 10 |

It result from the values collected in table V that candies including mannitol and which are subjected to the hygroscopicity test have, after a slight water reabsorption, a fine crystalline surface layer which retards or even interrupts any water absorption and hence ensures the preservation of the product.

It appears however, from table V, that this use of mannitol alone is manifested also by a very considerable increase in cold flow, which renders the improvement in preservation of the candies by the mannitol uncertain.

The conjoint employment of gum arabic and/or of CMC enables, on the other hand, the cold flow of the candy to be prevented whilst preserving the beneficial effect of the mannitol on the stability of the product, as appears from the tests whose results are collected in table VI; these tests have been carried out with 7.5% of mannitol and increasing amounts (3%, 4% and finally 5%) of gum arabic, the cooking temperatures being 160°, 170° and 180° C.

| Composition of the candy | | | Deformation | | |
|---|---|---|---|---|---|
| Proportion of mannitol | Proportion of gum arabic | Cooking temperature (°C.) | Deformation after the hygroscopicity test | Evaluation of the surface recrystallisation | Evaluation of cold flow |
| 0 | 0 | 180 | 9 | none | 4 |
| 7.5 | 3 | 160 | 0 | +++ | 10 |
| 7.5 | 3 | 170 | 0 | +++ | 8 |
| 7.5 | 3 | 180 | 0 | +++ | 2 |
| 7.5 | 3 | 160 | 0 | +++ | 8 |
| 7.5 | 4 | 170 | 0 | +++ | 8 |
| 7.5 | 4 | 180 | 0 | ++ | 1 |
| 7.5 | 4 | 160 | 0 | +++ | 7 |
| 7.5 | 5 | 170 | 0 | ++ | 5 |
| 7.5 | 5 | 180 | 0 | ++ | 0 |

The incorporation of gum arabic avoids any deformation of the product in the hygroscopicity test and ensures, for sufficient cooking temperatures, good resistance to cold flow of the candy composed of a mixture of hydrogenated starch hydrolysate and mannitol.

It is thus possible to combine a reduction in the hygroscopicity of the "sugarless" candy by the use of mannitol and an improvement in the resistance to cold-flow by the incorporation of gum arabic, which leads overall to a considerable improvement in the stability on preservation of candy based on hydrogenated starch hydrolysate.

We claim:

1. Sugarless hard candy essentially consisting of
   hydrogenated starch hydrolysate, prepared from a starch hydrolysate having a DE of 42 to 60, and of
   gum arabic in an amount of between 1% and 8% by weight with respect to the finished product, and/or CMC in an amount comprised between 0.2 and 2% by weight with respect to the finished product.

2. Sugarless hard candy essentially consisting of
   hydrogenated starch hydrolysate, prepared from a starch hydrolysate having a DE of 42 to 60, and of
   gum arabic in an amount of between 1% and 8% by weight with respect to the finished product, and/or CMC in an amount comprised between 0.2 and 2% by weight with respect to the finished product, and
   additives selected from the group comprising flavours, acids and dyes.

3. Sugarless hard candy essentially consisting of
   hydrogenated starch hydrolysate, prepared from a starch hydrolysate having a DE of 42 to 60, and of
   gum arabic in an amount of between 1% and 8% by weight with respect to the finished product, and/or CMC in an amount of between 0.2 and 2% by weight with respect to the finished product, and
   up to 10% by weight of mannitol, and
   additives selected from the group comprising flavours, acids and dyes.

4. Sugarless hard candy according to anyone of claims 1 to 3, wherein the amount of gum arabic is comprised between 2 and 6% by weight.

5. Sugarless hard candy according to anyone of claims 1 to 3, wherein the amount of CMC is comprised between 0.3 and 1.2% by weight.

6. Sugarless hard candy according to anyone of claims 1 to 3, wherein the hydrogenated starch hydrolysate is prepared from a starch hydrolysate having a DE comprised between 45 and 60.

7. Sugarless hard candy according to anyone of claims 1 to 3, wherein the hydrogenated starch hydrolysate is prepared from a starch hydrolysate having a DE comprised between 45 and 55.

8. Sugarless hard candy according to anyone of claims 1 to 3, wherein the hydrogenated starch hydrolysate comprises, expressed with respect to the dry matter of the hydrolysate:
- a sorbitol content of 0.1 to 19%,
- a maltitol content of 35 to 80%,
- the complement to 100 being constituted by polyols of degree of polymerisation (DP) higher than 2.

9. Sugarless hard candy according to anyone of claims 1 to 3, wherein the hydrogenated starch hydrolysate comprises, expressed with respect to the dry matter of the hydrolysate:
- a sorbitol content of 0.2 to 17%,
- a maltitol content of 35 to 65%,
- the complement to 100 being constituted by polyols of degree of polymerisation (DP) higher than 2.

10. Sugarless hard candy according to anyone of claims 1 to 3, wherein the hydrogenated starch hydrolysate comprises, expressed with respect to the dry matter of the hydrolysate:
- a sorbitol content of 0.2 to 17%,
- a maltitol content of 40 to 50%,
- the complement to 100 being constituted by polyols of degree of polymerisation (DP) higher than 2.

11. Sugarless hard candy according to anyone of claims 1 to 3, wherein the hydrogenated starch hydrolysate comprises, expressed with respect to the dry matter of the hydrolysate:
- a sorbitol content of 0.1 to 19%,
- a maltitol content of 35 to 80%,
- a content in products of DP higher than 20, less than 3%,
- the complement to 100 being constituted by polyols of degree of polymerisation (DP) higher than 2.

12. Sugarless hard candy according to anyone of claims 1 to 3, wherein the hydrogenated starch hydrolysate comprises, expressed with respect to the dry matter of the hydrolysate:
- a sorbitol content of 0.1 to 19%,
- a maltitol content of 35 to 80%,
- a content in products of DP higher than 20, less than 1.5%,
- the complement to 100 being constituted by polyols of degree of polymerisation (DP) higher than 2.

13. Sugarless hard candy according to anyone of claims 2 to 3, wherein the content of mannitol is comprised between 1 and 8% by weight of the total mass of the candy.

14. Process for the preparation of sugarless hard candy according to anyone of claims 1 to 3, comprising the successive steps:
- of incorporating with the hydrogenated starch hydrolysate, the gum arabic and/or the CMC, the conventional additives if any and the mannitol if any,
- of heating the thus obtained mixture to a temperature higher than 140° C.,
- of maintaining this temperature under a vacuum of at least 700 mm Hg until the moisture content of the mixture is brought to a value of about 3% by weight to about 1% by weight,
- and of wrapping the candies thus obtained after shaping and cooling.

* * * * *